United States Patent [19]
Khoja

[11] Patent Number: 4,734,982
[45] Date of Patent: Apr. 5, 1988

[54] PLASTIC-PIPE CUTTER

[76] Inventor: Fatehally E. Khoja, 14 Shadwell Place, Don Mills, Ontario M3B 1J5, Canada

[21] Appl. No.: 900,340

[22] Filed: Aug. 25, 1986

[30] Foreign Application Priority Data

Jul. 11, 1986 [CA] Canada .................................... 513553

[51] Int. Cl.$^4$ ............................................. B23D 21/06
[52] U.S. Cl. ......................................................... 30/96
[58] Field of Search .................. 30/92, 94, 95, 96, 91.1

[56] References Cited

U.S. PATENT DOCUMENTS

| | | |
|---|---|---|
| 823,796 | 6/1906 | Leyes ..................................... 30/95 |
| 1,763,299 | 6/1930 | Galbraith ............................... 30/95 |
| 2,869,413 | 1/1959 | Anderson ............................... 30/94 |
| 4,092,775 | 6/1978 | Erpenbeck ............................. 30/95 |
| 4,146,959 | 4/1979 | Hopper .................................. 30/95 |

Primary Examiner—E. R. Kazenske
Assistant Examiner—Eugenia A. Jones

[57] ABSTRACT

A manually operated tool, for cutting plastic pipe, in which there is a circular hole in the body of the tool into which the pipe is inserted. A longitudinal sharp-edged blade, hinged in the body at one end and to an adjusting screw at the other end of the blade is brought down to bear on the plastic pipe at right angle to the pipe axis by means of the adjusting screw just mentioned. The blade is located in a slot in the body of the tool and is able to slide freely in the slot. A removable annular bushing or sleeve is to be fitted into the circular hole in the body to accommodate different diameter plastic pipes.

5 Claims, 1 Drawing Sheet

PLASTIC-PIPE CUTTER

BACKGROUND OF THE INVENTION

1. Field of the Invention

The present invention relates to a manually operated pipe cutting device for plastic pipes such as A.B.S. (Acetate Butate Styrene) plastic pipe.

2. Description of the Prior Art

In order that standard plastic fittings such as A.B.S. fittings can be used without difficulty with such pipe in plumbing installations, the pipe must be round, the cut square and without burrs. An existing roller type of cutting device used for cutting copper pipe and tubes cannot be used for cutting plastic pipe since the device employs the principle of compressive yielding which the metal pipe or tube is able to accommodate. Plastic pipes including A.B.S. plastic pipe does not remain rigid and would have a tendency to 'squash-up' when subjected to cutting by such a tool rendering inaccurate, difficult and time-consuming cuts.

A plastic pipe-cutting tool presently available on the market employs a pawl and rachet arrangement which mechanism provides incremental stepwise motion of a semi-circular blade. The tube or plastic pipe is inserted into an open-ended slot (much like an open-ended wrench). The semi-circular blade, ejected incrementally from inside one jaw, presses against the tube or pipe until it is cut, when the blade butts against the opposite jaw. This device accommodates a maximum 1½ inches outside diameter of pipe. It is ideal for cutting flexible hose and the like, However it tends to squash and possibly crack semi-rigid plastic pipe such as A.B.S. pipe. This would be even more so if it were made for larger than 1½ inches outside diameter pipes.

A device for cutting rolled-up plastic or fabric blinds or screens can be seen in U.S. Pat. No. 4,146,959 Hopper 1979. However this device employs a blade mounted on a cantilever type subsidiary member which in turn is spring loaded to apply a cutting force. This random movement of the blade could hardly provide the positive incremental cutting action required for cutting plastic pipes which are much harder.

The common practice herefore is to cut the plastic pipe with a wood-cutting saw or metal-cutting saw. These result in a rough and irregular cut which is also not square to the axis of the pipe. The rough pipe cut has to be trimmed and deburred with sandpaper or a file before a glued joint can be made with a fitting.

SUMMARY OF THE INVENTION

It is the aim of the present invention to overcome the problems and disadvantages of cutting plastic pipe by providing a continuous finely controlled cutting action by a smooth knife-edge blade on the pipe as opposed to the compressive yielding principle employed by other devices. This results in the pipe being cut to the exact length required, the cut is clean, no deburring is required and the cut is square to the axis of the pipe. There is no material wastage in the form of 'saw dust' and 'trimmings'. The device, thereby, allows for maximum time efficiencies in the pipe-cutting function. All parts are easily assembled and the blade can be easily replaced when worn.

The construction includes a knife-edged blade caused to slide in a slot in the body of the tool by an adjusting screw, the said body also containing a circular hole to accommodate the diameter of the pipe which will be cut. The pipe to be cut is inserted in this circular hole and the device is rotated around the pipe.

BRIEF DESCRIPTION OF THE DRAWINGS

Having thus generally described the nature of the invention, reference will now be made to the accompanying drawing, showing by way of illustration a preferred embodiment thereof and in which.

DESCRIPTION OF THE PREFERRED EMBODIMENTS

Figure 1:
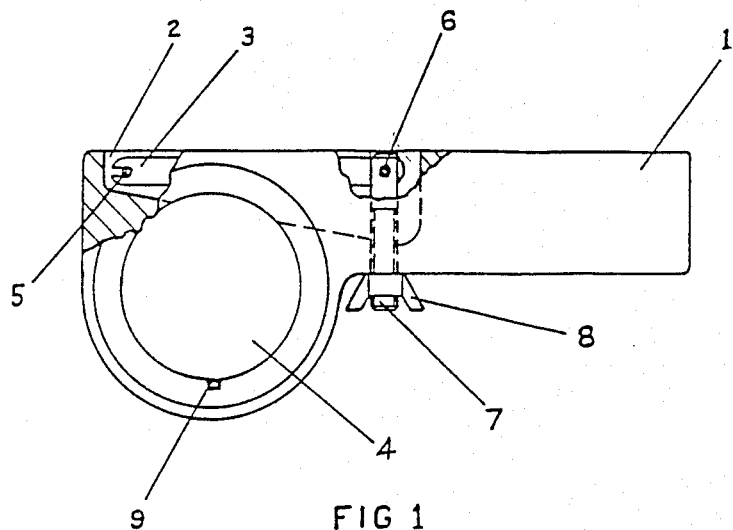
FIG. 1 is a front elevation partly in cross section along the line A—A of FIG. 2.
Figure 2:
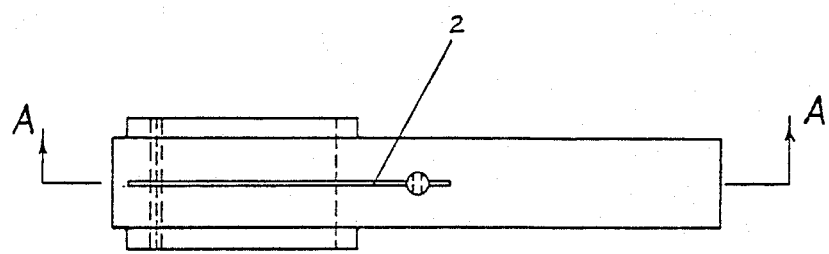
FIG. 2 is a top view of this embodiment.
Figure 3:
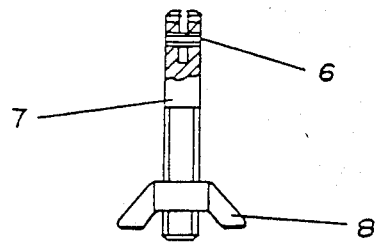
FIG. 3 is a sub-assembly of the screw with wing nut and pin.

Referring to the drawing, the tool illustrated comprises a body (1) with a slot (2) in it, in which a longitudinal knife-edge blade (3) is guided and caused to slide perpendicularly to the axis of the hole (4). The pipe to be cut is inserted into this hole. A second smaller hole aligned with the slot forms a guide for the screw (7).

Figure 4:
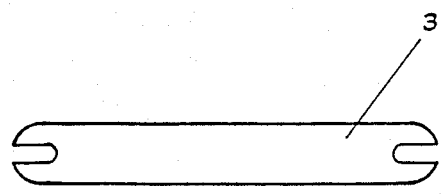
FIG. 4 is a front elevation of the blade.

The blade (3) also shown separately in FIG. 4 has a slot at each end. One end of the blade is hinged, by means of the slot in it, onto a pin (5) which is fixed in the body of the tool. The pin is a standard slit spring-pin and is held by spring action in a third hole in the body of the tool. The other end of the blade is hinged onto a pin (6) at one end of the adjusting screw (7). The other end of the adjusting screw has a wing nut or equivalent (8). Tightening this nut brings the blade to bear down on the plastic pipe. The adjusting screw (7) is able to slide freely in its guide hole in the body of the tool.

The tool is operated by inserting the pipe into the hole (4) to the extent required and bringing the blade to bear down onto the pipe by means of tightening the wing nut or equivalent. The tool is then rotated around the pipe a full turn or two and the wing nut further tightened. The tool is again rotated around the pipe and the procedure repeated until the pipe has been cut.

Figure 5:
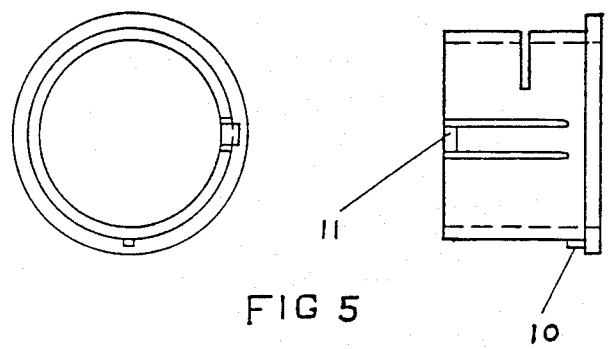
FIG. 5 shows the bushing adapter in 2 views which is used when cutting a different size of pipe.

The embodiment shown in FIG. 5 is a bushing adapter shown in two views which bushing slides into the hole (4) of the main body (1) of the tool and locks into position. This bushing enables a different diameter of pipe to be cut. It has in its design a provision for proper location and locking into position. The location requirement is accomplished by a short groove (9) in the hole (4) of the main body of the tool and a short spigot (10) on the outside of the bushing. It is held in position in the hole by a spring-type arrangement (11) in the bushing, the said arrangement being achieved by making two slits approximately ¼ inch apart about ¾ the depth of the bushing with a raised portion at the free end of the cantilever so obtained.

I claim:

1. A manually operated tool for cutting plastic-pipe, comprising an essentially one-piece body and handle with a large circular hole at one end, the said handle forming an extended part of the said body, into which the pipe is inserted, for close fitting engagement around said pipe, a longitudinal knife edge blade oriented along length of said body and handle, intersecting said hole, crosswise to axis of said pipe and directly engaged on a pin at one end in said body and guided in a slot in said body, a screw means at other end of said blade connected between said blade and said body to move said blade in said slot for positive tangential cutting engagement with the said pipe, said screw means reciprocally mounted in a second smaller circular hole essentially aligned with the said slot and crosswise to the said large circular hole.

2. A tool as claimed in claim 1 further comprising: means for adjusting the size of the said large circular hole for close fitting engagement with said pipe of various sizes.

3. A tool as claimed in claim 2 wherein said adjusting means comprises at least one annular bushing mountable directly in said large circular hole.

4. A tool as claimed in claim 3 wherein said annular bushing is provided with a slit crosswise to axis of said annular bushing for accommodating said longitudinal blade in cutting engagement with said pipe.

5. A tool as claimed is claim 3 wherein said annular bushing is provided with means for locating and locking said annular bushing in said large circular hole.

* * * * *